United States Patent
Zhu et al.

(10) Patent No.: US 7,313,814 B2
(45) Date of Patent: Dec. 25, 2007

(54) SCALABLE, ERROR RESILIENT DRM FOR SCALABLE MEDIA

(75) Inventors: Bin Zhu, Edina, MN (US); Chun Yuan, Beijing (CN); Shipeng Li, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/405,973

(22) Filed: Apr. 1, 2003

(65) Prior Publication Data

US 2004/0196972 A1 Oct. 7, 2004

(51) Int. Cl.
- G06F 15/16 (2006.01)
- G06F 17/30 (2006.01)
- G06F 7/04 (2006.01)
- G06F 7/58 (2006.01)
- G06F 19/00 (2006.01)
- G06F 9/00 (2006.01)
- H04L 9/32 (2006.01)

(52) U.S. Cl. .............. 726/6; 726/3; 726/18; 380/201; 380/277; 705/57; 705/64

(58) Field of Classification Search .............. 726/6
See application file for complete search history.

(56) References Cited

U.S. PATENT DOCUMENTS

| | | | |
|---|---|---|---|
| 6,006,283 A | | 12/1999 | Hsieh et al. |
| 6,128,737 A | * | 10/2000 | Jakubowski et al. ........ 713/181 |
| 6,182,214 B1 | * | 1/2001 | Hardjono .............. 713/163 |
| 6,351,491 B1 | * | 2/2002 | Lee et al. ............ 375/240.03 |
| 6,392,705 B1 | * | 5/2002 | Chaddha ................ 348/388.1 |
| 7,072,366 B2 | | 7/2006 | Parkkinen et al. |
| 7,167,560 B2 | | 1/2007 | Yu |
| 2003/0021296 A1 | | 1/2003 | Wee et al. |

FOREIGN PATENT DOCUMENTS

| | | |
|---|---|---|
| EP | 0766471 | 4/1997 |
| EP | 1189432 | 3/2002 |
| EP | 1271280 | 1/2003 |
| JP | 2002 87628 | 4/2002 |

OTHER PUBLICATIONS

C Shi et al.; "An Efficient MPEG Video Encryption Algorithm" Proceedings of the 17th IEEE Symposium on Reliable Distributed Systems. SRDS 98. West Lafayette IN Oct. 20-23.

(Continued)

*Primary Examiner*—Gilberto Barron, Jr.
*Assistant Examiner*—Samson Lemma
(74) *Attorney, Agent, or Firm*—Lee & Hayes, PLLC

(57) ABSTRACT

An exemplary digital rights management engine and related methods divides multimedia content into service level layers, encrypts at least some of the layers, and offers access to the encrypted layers by permission. The multimedia content may be layered using multiple different layering approaches simultaneously, and access to the different types of layers may be offered simultaneously. One of the layers may be left unencrypted to allow free browsing of a low quality service level. An exemplary system of key management for digital rights management is also disclosed.

63 Claims, 9 Drawing Sheets

OTHER PUBLICATIONS

S. J. Wee et al.; "Secure scalable streaming enabling transcoding without decryption" Proceedings 2001 International Conference on Image Processing. ICIP 2001 Thessaloniki Greece Oct. 7-10, 2001: IEEE vol. 1 of 3. Conf 8 10-07-01 pp. 437-440.

Adi Shamir, "How to Share a Secret"; Nick Szabo's Papers and Concise Tutorials: Massachusetts Institute of Technology; http://szabo.best.vwh.net/secret.html, May 23, 2003.

Sun, et al.; "Macroblock-Based Progressive Fine Granularity Scalable (PFGS) Video Coding with Flexible Temporal-SNR Scalabilities"; 0-7803-6725-1/01; 2001 IEEE; pp. 1025 through 1028.

Wu, et al; "A Framework for Efficient Progressive Fine Granularity Scalable Video Coding"; IEEE Transactions on Circuits and Systems for Video Technology, vol. 11, No. 3, Mar. 2001; pp. 332 through 343.

Grosbois, et al.; "Authentication and access control in the JPEG 2000 compressed domain"; In Proc. of the SPIE 46th Annual Meeting, Applications of Digital Image Processing XXIV, San Diego, Jul. 29-Aug. 3, 2001.

Wee, et al., "Secure Scalable Streaming Enabling Tanscoding Without Decryption", 0-7803-6725-1/01 2001 IEEE pp. 437 through 440.

Jakubowski, et al., "The Chain & Sum Primitive and Its Applications to MACs and Stream Ciphers", EUROCRYPT '98, pp. 281-293.

He, et al., "H.26L-Based Fine Granularity Scalable Video Coding"; ISCAS 2002, vol. 4, pp. 548-551, Phoenix, USA, May 2002.

* cited by examiner

SCALABLE, ERROR RESILIENT DRM FOR SCALABLE MEDIA

TECHNICAL FIELD

This invention relates generally to multimedia protection and more specifically to scalable, error resilient digital rights management for scalable media.

BACKGROUND

Digital rights management (DRM) for multimedia has become a popular way to protect the intellectual property of media content owners. The MPEG-4 Fine Granularity Scalability (FGS) video coding standard, for example, enables straightforward and flexible adaptation of one multimedia stream to different transmission and application needs. DRM plays an important role in protecting copyrighted multimedia items such as music and movies. There is a growing demand for DRM services in the market. DRM has already been implemented in MICROSOFT® products, such as WINDOWS MEDIA™ format and EBOOKS™ (Microsoft Corporation, Redmond, Wash., U.S.) But new DRM schemes are needed that are optimized for new scalable multimedia formats. These new multimedia formats and DRMs enable the growth of new business and service models.

Scalable video coding has gained wide acceptance due to its flexibility and easy adaptation to a wide range of application requirements and environments. "Scalable media adaptation and robust transport" (SMART and SMART++) is an example of a scalable multimedia scheme (see, e.g., <http://research.microsoft.com/im/>. Microsoft Corporation, Redmond, Wash.; Feng Wu, Shipeng Li, Ya-Qin Zhang, "A framework for efficient progressive fine granular scalable video coding", *IEEE Trans. on Circuits and Systems for Video Technology*, vol. 11, no. 3, pp. 332-344, 2001; Xiaoyan Sun, Feng Wu, Shipeng Li, Wen Gao, Ya-Qin Zhang, "Macroblock-based temporal-SNR progressive fine granularity scalable video coding", *IEEE International Conference on Image Processing (ICIP)*, pp. 1025-1028, Thessaloniki, Greece, October, 2001; and Yuwen He, Feng Wu, Shipeng Li, Yuzhuo Zhong, Shiqiang Yang, "H.26L-based fine granularity scalable video coding", *ISCAS* 2002, vol. 4, pp. 548-551, Phoenix, USA, May 2002).

In the MPEG-4 FGS scalable multimedia profile, a video stream is divided into two layers, the base layer and the enhancement layer. The base layer is a non-scalable coding of the video at a low bitrate, e.g., the lowest bitrate used in an application. The residue of each frame is encoded in the enhancement layer in a scalable manner: the discrete cosine transformation (DCT) coefficients of a frame's residue are compressed bit-plane wise from the most significant bit to the least significant bit. A video is compressed by MPEG-4 FGS only once. When it is transmitted over a network, a server can discard the enhancement layer data associated with the least significant bit(s) should the transmitting network lack required bandwidth. Other rate shaping operations can also be carried out on the FGS compressed data directly without resorting to either compression or decompression.

A multimedia encryption algorithm, whether for scalable or non-scalable codecs, ideally has these features: high security, low complexity, low compression overhead, error resilience, rate shaping adaptability, and random play ability. Security is an essential requirement for multimedia encryption. Compared to other types of encryption for more critical military and banking applications, multimedia encryption has its own particular issues, including the relative vastness of the video data to be encrypted and the usually low value of the information encrypted, compared with information encrypted for military and banking applications, for example.

Low complexity is an issue because any encryption or decryption process adds processing overhead. Since a multimedia stream has a relatively vast amount of data, it is desirable or mandatory in many applications that the complexity of an encryption system be very low, especially during decryption, since many applications require realtime decryption of the vast amounts of multimedia data, and usually on a user's equipment that has limited resources.

Compression overhead is also an issue since encryption inevitably affects compression efficiency by either reducing the compression algorithm's coding efficiency (directly) or by adding bytes to the already compressed file. Thus, the compression overhead is ideally minimized for multimedia encryption algorithms.

Error resilience is important because faults occur during multimedia storage and transmission. Wireless networks are notorious for transmission errors. Data packets may be lost in transmission due to congestion, buffer overflow, and other network imperfections. Encryption schemes are ideally resilient to bit error and package losses. They should also allow quick recovery from bit errors and fast resynchronization from package losses to prevent extensive error propagation. Multimedia encryption algorithms, typically designed under perfect transmission environments (most), propagate great perceptual degradation over time when bit errors or package losses occur during multimedia transmission.

Rate shaping describes the ability to vary the transmission bitrate (number of bits in one second of a stream) to suit various conditions. During multimedia stream delivery from the content owner to the user, many middle stages typically process the data. Transcoding, for example, may change the bitrate to adapt to transmission bandwidth fluctuation or even application requirements. If the data is encrypted, these middle stages typically must call for encryption and decryption keys and then execute cycles of encryption and decryption in order to process the data. This increases processing overhead and reduces security since encryption secrets have to be shared with these middle stages.

Users are accustomed to playing audio and video multimedia in fast forward, reverse, and with random access. An ideal DRM system should not deprive users of these options. This means an encryption algorithm used in DRM should be able to handle random play within chain-encrypted data or, in the case that data is not chain-encrypted for the sake of random access, be able to avoid security vulnerability from "dictionary" and other attacks on the encryption.

While there are many encryption algorithms proposed for non-scalable multimedia formats, a few are designed specifically for scalable multimedia formats. Wee, et al., propose a secure scalable streaming (SSS) scheme that enables transcoding without decryption. (S. J. Wee and J. G. Apostolopoulos, "Secure Scalable Streaming Enabling Transcoding Without Decryption," *IEEE Int. Conf. Image Processing*, 2001, vol. 1, pp. 437-440.) For MPEG-4 FGS, the approach encrypts video data in both base and enhancement layers except header data. Hints for RD-optimal (rate distortion-optimal) cutoff points have to be inserted into the unencrypted header for a middle stage to perform RD-optimal bitrate reduction. Encryption granularity depends on the way a video stream is packetized. More precisely, encryption is applied to each packet. No modification on the packet size is allowed after encryption is done. SSS protects scalable media as a single access layer.

Grosbois et al. propose a scalable authentication and access control scheme for the image compression standard of JPEG 2000. (Raphael Grosbois, Pierre Gergelot, and Touradj Ebrahimi, "Authentication and Access Control in the JPEG 2000 compressed domain," *Proc. of SPIE 46th Annual Meeting, Applications of Digital Image Processing XXIV*, San Diego, 2001.) It is based on modification and insertion of information in the bit steam. A keyed hash value is used to generate a pseudo-random sequence that is used to pseudo-randomly invert the signs of high-frequency band wavelet coefficients. Layered access structure allows adaptation to different applications. One of its major drawbacks is the insertion of extra information to aid decryption, which reduces compression efficiency.

SUMMARY

An exemplary digital rights management engine and related methods divide multimedia content into service level layers, encrypt at least some of the layers, and offer access to the encrypted layers by permission.

The multimedia content may be layered using multiple different layering approaches simultaneously, and access to the different types of layers may be offered simultaneously. One of the layers may be left unencrypted to allow free browsing of a low quality service level. The exemplary subject matter is especially conducive to digital rights management of MPEG-4 FGS bitstreams, SMART and SMART++ audio-visual representations, and other streamable and scaleable multimedia.

Two exemplary types of service level layers are peak signal-to-noise ratio layers and bitrate layers. The layers may be encrypted using a separate key for each layer, and rights to a key granted by permission. Rate shaping, for example during transcoding, may be performed by intermediate network entities without decrypting the layers. Possession of a key for a higher service level typically includes keys for lower levels, or low service level keys can be derived from a higher service level key but not vice versa. This allows a user to download only a difference between quality levels, saving time and resources, rather than downloading the entire multimedia stream afresh.

DETAILED DESCRIPTION

Overview

Figure 1:
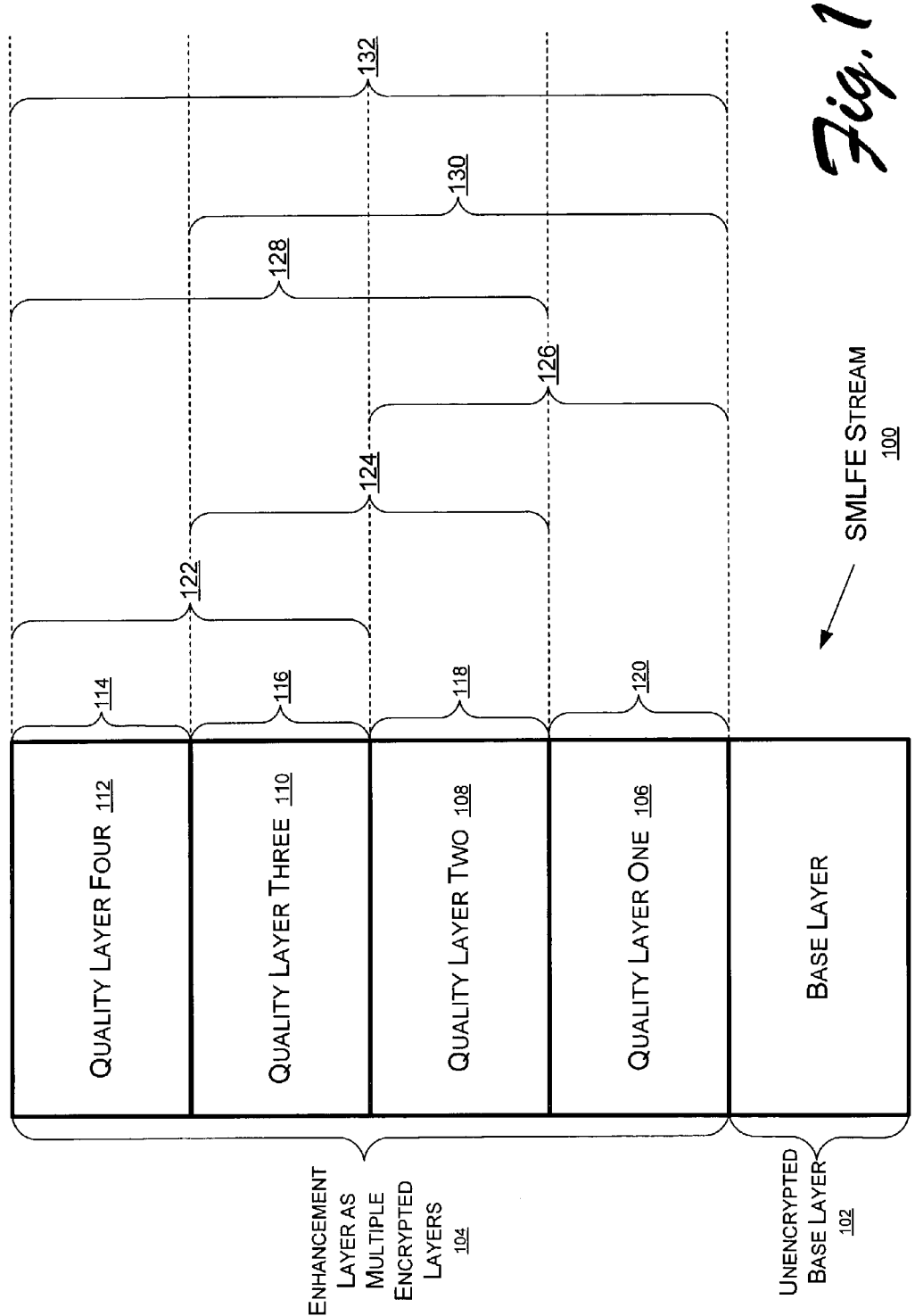
FIG. 1 is a graphic representation of an exemplary multimedia stream divided into layers.

Subject matter includes an exemplary digital rights management engine (DRE) and related DRM methods for multimedia content using general scalable audio/video coding or particular coding schemes, such as MPEG-4 FGS, SMART, and SMART++. The subject matter produces, in one implementation, a scalable multi-layer encrypted stream that allows multiple access layers. In an exemplary implementation, the stream is a scalable multi-layer FGS encrypted stream, "SMLFE stream," which will be used herein as an example. Even though a SMLFE stream will be used herein as an example, the subject matter applies to content using general scalable audio and/or video coding.

An SMLFE stream can offer free browsing of a low quality base layer video (encrypted or non-encrypted) and at the same time control access to enhancement layer data via different quality layers, each corresponding to a service level. Quality, as used here, means the level of visual and/or audio (perceptual) resolution and detail apparent in an image and/or sound, or in other words, the perceived fidelity of an image and/or sound to the original non-coded subject matter. More data is typically needed to provide higher quality image and sound.

Various users may have different quality needs related to the same video stream. A virtual tour of the inside of a home, for example, may be used by one user as a "dream home" presentation for a group of investors and architects. Although the high fidelity version of the video may incur an expense, the quality of the video is the main issue for this type of user. The same video may be played by a construction worker on a crude handheld communications device to locate walls within the home. Such a user does not care about high fidelity, but is concerned with receiving a minimum of video data to reduce downloading time.

In an MPEG-4 FGS implementation, the exemplary DRM method is scalable: for example, a user receiving part of an SMLFE stream at a lower service level can decide to watch the video at a higher service level and simply download a stream comprising the difference between the two service levels to combine with the lower service level stream. If a user has already obtained all encrypted content (such as from a CD or DVD), this can be fulfilled by simply buying and downloading the key for the higher service level. Exemplary DRM methods are fast and provide robust handling of transmission errors and packet loss, as the exemplary encryption described herein does not degrade image quality. This is due to an exemplary encryption structure that aligns encryption cells with MPEG-4 FGS video packets.

The exemplary DRE and related DRM methods offer random access, fast forward and reverse play, flexible quality control, and other rate shaping operations without having to decrypt the video. Security is provided by not having to share encryption secrets with middle (e.g., network) stages during delivery of an SMLFE stream from the content owner to the user. Exemplary DRM methods are also applicable to many other scalable multimedia codecs.

Aspects of the subject matter can be added to the current MICROSOFT® DRM for WINDOWS MEDIA™ format and other scalable formats to be supported by WINDOWS®. The subject matter can also be used for MPEG-4's IPMP (Intellectual Property Management and Protection).

Quality Layers

As shown in FIG. 1, a multimedia stream, such as a MPEG-4 FGS bitstream that has been encrypted into an exemplary SMLFE stream 100 using various exhibited subject matter, is divided into a base layer 102 and an enhancement layer 104. The enhancement layer is divided into different levels called quality layers 106, 108, 110, 112 that are used to provide a user receiving the exemplary SMLFE stream 100 with layered access, that is "service levels." An exemplary SMLFE stream 100 includes service level divisions based on both peak signal-to-noise ratio (PSNR) (similar to variable bitrate coding) and bitrate (similar to constant bitrate coding) that can be accessed simultaneously. The same exemplary SMLFE stream 100 can be divided simultaneously into different types of quality layers, i.e., different quality layer schemes can operate on the same exemplary SMLFE stream 100 at once. For example, a content owner who wants to exercise digital rights management (DRM) over video content can decide to layer the SMLFE content according to PSNR layers and bitrate layers, and can implement these two layering schemes simultaneously on the same SMLFE content. The content owner can further specify where the boundaries between the PSNR layers (i.e., PSNR service levels) and between the bitrate layers (i.e., bitrate service levels) are to be drawn based on audiovisual characteristics of the SMLFE content and business needs. Other types of quality layers (i.e., service levels) may be used, for example frame size quality layers (each quality layer can be one frame size), frame rate quality layers (each frame rate is a layer), color depth quality layers (each color depth is a layer), quantity of channels quality layers (each channel is a layer), sampling rate quality layers (each sampling rate is a layer), bandwidth quality layers (a full spectrum is divided into frequency bands and each band can be a layer), audio sample resolution quality layers (each sample size of 8 or 16 or 24 bits representing each audio sample can be a layer), etc. All these types of quality layers and more can be combined together with each other or with the above-described PSNR and bitrate type quality layers in order to make simultaneous quality layering schemes within the same media content.

In one implementation of the subject matter, PSNR service levels are a desirable choice if layered access to the quality layers 106, 108, 110, 112 is to be provided in terms of image quality, even though PSNR is not known to be a good, or at least linear, metric of image quality. If the SMLFE stream 100 is to be sent over a network, however, service level divisions can also be established by bitrate (i.e., the bitrate service levels). Exemplary DREs and related methods support both PSNR service levels and bitrate service levels simultaneously using the same quality layers 106, 108, 110, 112. An exemplary SMLFE stream 100 allows dynamic service level determination, as well as rate shaping on video ciphertext directly without decryption of the quality layers. Thus, during realtime processing, an intermediate processing server can dynamically ascertain from the ciphertext the type of service layer to be used (PSNR or bitrate) without decrypting the stream.

The exemplary quality layers 102, 104, 106, 108 of the MPEG-4 FGS enhancement layer 104 are each encrypted with separate encryption secrets, for example, a key, and in one implementation the base layer is left unencrypted and distributed freely on a public medium, such as the Internet. In another implementation, encrypted content of all the layers is freely distributed to the public, but because all of the content except the base later is encrypted, keys are granted to access the encrypted layers. Encryption can be done at the same time as scalable coding. The actual service level delivered to a user is decided at a later stage after the encryption process.

The subject matter allows higher service levels to access the data of lower service levels, but not vice versa. As mentioned, if a user decides to upgrade from a lower service level to a higher service level, the user need only download the difference between the lower and higher quality levels. In the exemplary SMLFE stream 100 with five quality layers 106, 108, 110, 112 in addition to the base layer 102, there are ten possible downloads that could be performed to supply a user with an upgrade in service level without having to download the entire exemplary SMLFE stream 100. For example, if a user already has permission to access quality layer three 110 then to access the next higher service level after gaining permission to do so, the user would have to download only data representing the difference 114 between quality layer four 112 and quality layer three 110. Similar downloads can be made for upgrades of one layer between the other service levels, i.e., differences 116, 118, 120. Upgrades two service levels higher entail downloading slightly more data as shown by the differences 122, 124, 126 between lower service levels and quality layers two service levels higher. The amount of data to be downloaded for an upgrade of two service levels is still much less than downloading the entire exemplary SMLFE stream 100 afresh. Of course, downloading time and resources are also saved in upgrades from a first quality layer to a quality layer three service levels higher, as shown by differences 128, 130. Also, an upgrade from the base layer 102 to highest quality layer four 112 requires a data download equal to the difference 132, but this is still less than downloading the entire exemplary SMLFE stream 100, which would entail downloading the base layer 102 again.

In one implementation, as mentioned, the base layer 102 can be exposed without encryption for free browsing of the video stream at low quality. This is useful for activities such as sampling a video before buying a pay-per-view presentation of the video or performing a content-based search on the unencrypted base layer 102 data without having to decrypt any of the higher quality layers 106, 108, 110, 112.

Various exhibited subject matter prevents cross-access of different types of services by the same user, i.e., access to a PSNR service level does not enable access to bitrate service levels, and vice versa, even though all encrypted data may be available to a user.

Exemplary DRM Environment

Figure 2:
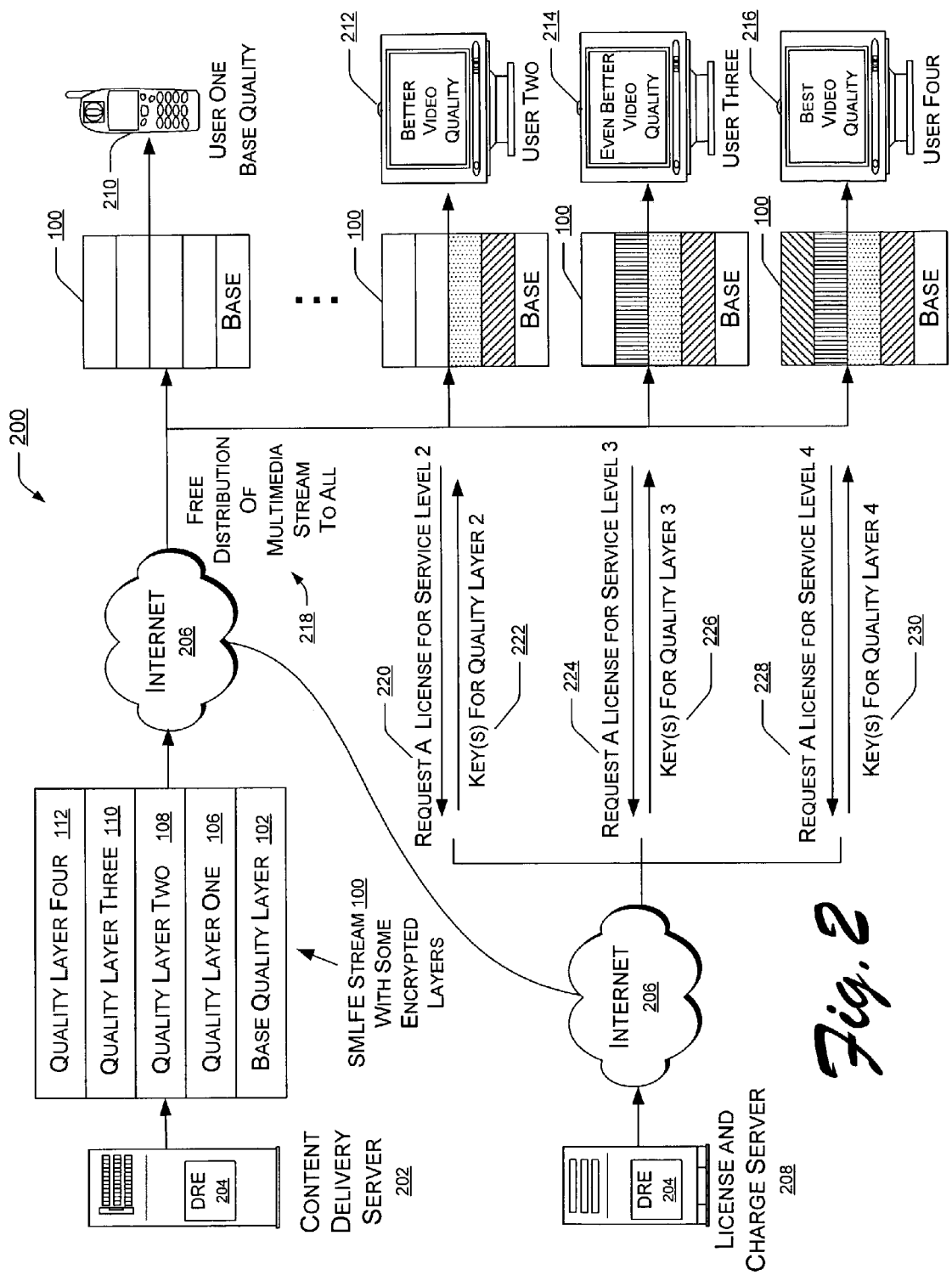
FIG. 2 is a block diagram of an exemplary networking environment for practicing the subject matter.

FIG. 2 shows an exemplary implementation of the subject matter over an exemplary networking environment 200. The networking environment 200 includes a content delivery system 202 that includes an exemplary DRE 204 communicatively coupled to a network, such as the Internet 206. A license and charge server 208 that also includes an exemplary DRE 204 is also communicatively coupled to the same network, e.g., the Internet 206. The exemplary DRE 204 in the content delivery server 202 may be communicatively coupled to the exemplary DRE 204 in the license and charge server 208, or alternatively, the exemplary DRE 204 in the license and charge server 208 may be a remote part of the exemplary DRE 204 in the content delivery server 202. The networking environment 200 also includes several users 210, 212, 214, 216 who are directly or indirectly communicatively coupled with the network, i.e., the Internet 206. By being coupled with the Internet 206, each user is thereby communicatively coupled with the content delivery system 202 and the license and charge server 208. The exemplary DRE 204 in the content delivery system 202 produces, in this implementation, an exemplary SMLFE stream 100.

A "super distribution" model is used as the context for this networking environment 200, even though the subject matter can also be used with other distribution models. In a super distribution model, video content is encrypted and the content owner sends the encrypted content to the content delivery system 202 for free distribution and downloading 218. If a user 210, 212, 214, 216 wants to access a certain service level provided by the exemplary SMLFE stream 100, the user requests permission to access the desired service level. Corresponding rights descriptions and the keys to access a particular quality layer of the encrypted content will be sent to a user who obtains, for example, a license for that layer. The user typically pays a fee and downloads the desired license from the license and charge server 208. Before making the decision to buy a license for a particular service level, the user may view the free lowest quality base layer 102. After obtaining a license for a particular service level, the user downloads or streams the corresponding or additional encrypted content and enjoys the multimedia.

User one 210 wants part of a movie video for quick review on the display of a cell phone. The cell phone has limited bandwidth and a low resolution display. Hence, user one 210 downloads the free base quality layer 102 of the exemplary SMLFE stream 100. The base quality layer 102 provides only low resolution video, but that is as much as the cell phone can handle. Besides, the base quality layer 102 has much less data to download than higher quality layers 106, 108, 110, 112 and in this implementation does not require a license or a fee. This is ideal for user one 210.

User one 210 calls user two 212 on the cell phone and praises the movie. User two 212, in order to enjoy a better quality of the video, requests a license 220 for a higher service level than the base quality layer 102 seen by user one 210, placing an order to the license and charge server 208. User two 212 orders quality layer two 108, or in other words, the second service level. The license and charge server 208 charges a fee for service level two, and sends the key(s) 222 for quality layer two 108.

User three 214 has also seen the low resolution version of the video downloaded on his home computer and now wants to see the entire movie on a good screen. Hearing of the special effects in the movie, user three 214 wants very good video quality. User three 214 requests a license 224 for service level three, that is, quality layer three 110 of the exemplary SMLFE stream 100. The license and charge server 208 sends user three 214 the key(s) 226 for quality layer three 110.

User four 216, a videophile, has only the best video equipment and wants to have a showing of the movie for his videophile club. User four 216 has already previewed the entire movie on service level one, and now requests a license 228 for the highest service level, quality layer four 112. The license and charge server 208 sends user four 216 the key(s) 230 for access to service level four for enjoying the best video quality. Since user four 216 already has service level one, he need only download the difference between quality layer four 112 and quality layer one 106.

In some implementations, all the users 210, 212, 214, 216 may download all encrypted layers of the exemplary SMLFE stream 100 but only have permission to decrypt those layers they are licensed for. All encrypted layers can also be distributed by CD, DVD, or other storage media instead of downloading. In other implementations, such as the one described with regard to FIG. 2, each user is sent only data relevant to their licensed service level(s), i.e., a minimum of data. This saves time and resources. In the case of streaming data for a higher service level, the user may inform the streaming server to send only needed data (the data accessible under the obtained license). In some implementations, encrypted data may be downloaded to a user through different sources such as different content delivery servers, different users in a peer-to-peer network, or a combination of content delivery servers and users.

Exemplary Digital Rights Engine (DRE)

Figure 3:
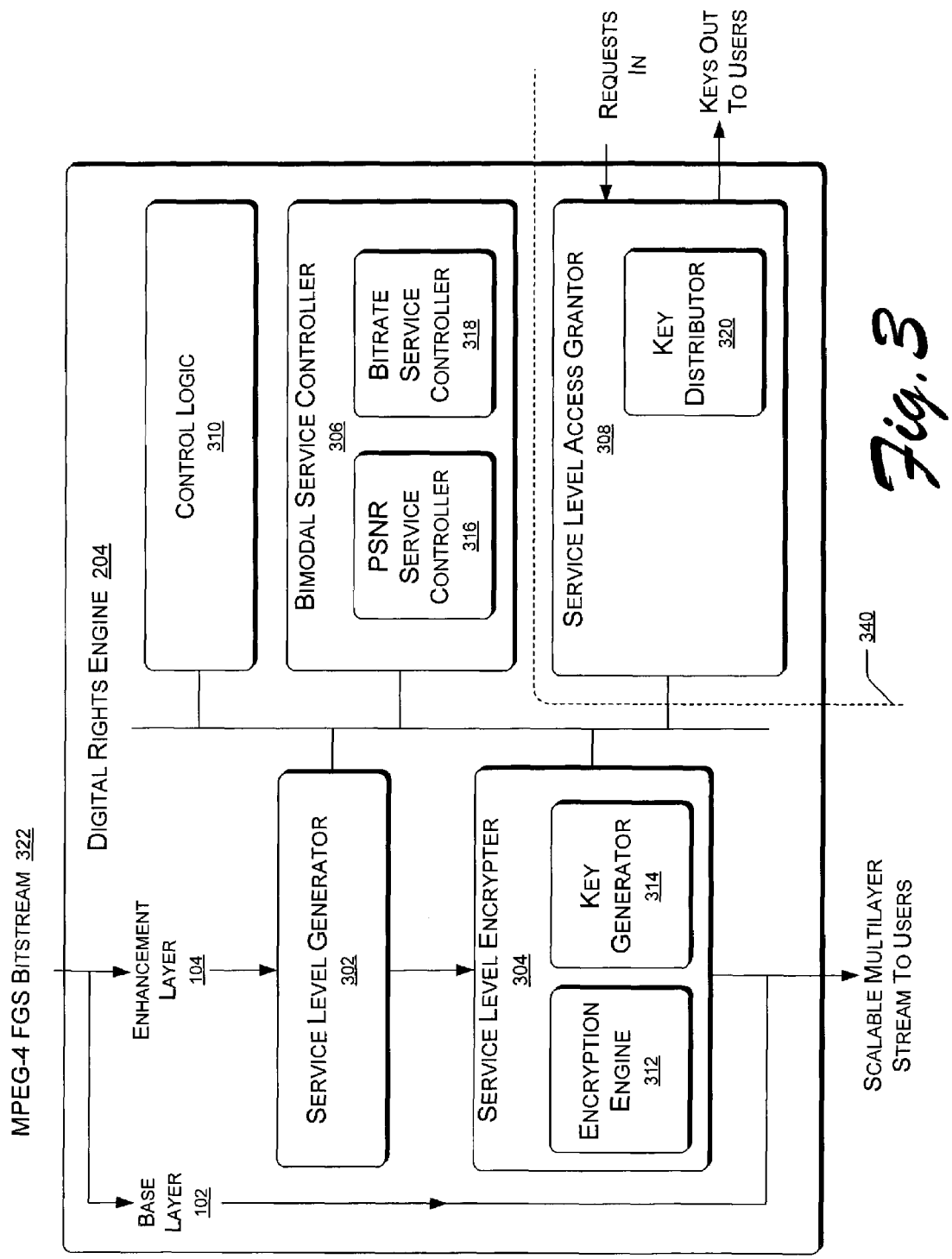
FIG. 3 is a block diagram of an exemplary digital rights management engine.

FIG. 3 shows the exemplary DRE 204 of FIG. 2 in greater detail. In one implementation, the exemplary DRE 204 has a service level generator 302, a service level encrypter 304, a bimodal service controller 306, and a service level access grantor 308 communicatively coupled with control logic 310 as illustrated. The service level encrypter 304 further includes an encryption engine 312 and a key generator 314. The bimodal service controller 306 further includes a PSNR service controller 316 and a bitrate service controller 318. The service level access grantor 308 further includes a key distributor 320. Of course, FIG. 3 depicts only one exemplary configuration of the exemplary DRE 204. Another configuration is a single service controller instead of the bimodal controllers in 306. In some implementations, the enhancement layer can contain several different types of enhancement data to enable the different quality layer types or quality layers schemes, such as frame size scalability, frame rate scalability, bitrate scalability, etc., and each type of quality layer in the enhancement data can be associated with a service controller. The subject matter contemplates many other configurations that can perform exemplary DRM methods.

The exemplary DRE 204 receives an MPEG-4 FGS bitstream 322 having a base layer 102 and an enhancement layer 104. In an implementation in which the base layer 102 does not get encrypted, the base layer 102 may pass through the exemplary DRE 204 unchanged, but may serve as a reference stream for the quality levels to be encrypted from the enhancement layer 104. The service level generator 302, which divides the enhancement layer 104 into service levels for encryption, receives the enhancement layer 104 component of the MPEG-4 FGS bitstream 322. The MPEG-4 FGS bitstream 322 is grouped into video packets, which are usually separated by resynchronization markers (called vp_markers in the following). A bit plane start code fgs_bp-_start_code in the enhancement layer 104 also serves as a resynchronization marker for error resilience. Both the resynchronization marker and the bit plane start code will be referred to here as vp-markers, hence the data separated by vp-markers will be called a video packet. The length of a video packet in MPEG-4 FGS is not based on the number of macroblocks included, but instead on the number of bits contained in that packet (i.e., the video packets are aligned with macroblocks, or "macroblock aligned"). Each video packet is an encryption cell that is encrypted independently. Headers as well as the vp-markers are typically not encrypted.

The service level generator 302 determines two types of service levels at once. PSNR service levels are determined by selecting groups of adjacent bit planes of the enhancement layer 104. The total number of bit planes may be divided into t adjacent groups to form t PSNR service levels. Bitrate service levels are also determined by dividing a frame's enhancement data into m different groups to form m bitrate service levels, with each bitrate service level aligned with the boundary of video packets. The enhancement layer 104 has then been divided into (m×t) totally different segments. A content owner can use any scheme to group bit planes or bitrates (video packet aligned) together to form PSNR and bitrate service levels. Schemes to separate the enhancement layer data into PSNR layered service levels or bitrate layered service levels are well known in the art of video coding, but a scheme of four equal layers of each is used herein as an example.

Once the service level generator 302 has determined PSNR and bitrate service levels, the exemplary DRE 204 provides a framework for encrypting these PSNR or bitrate layers using keys, and for licensing the keys to users to unlock quality levels of the encrypted content without having to disclose the keys to middle stages between the content owner and the user.

In the exemplary service level encrypter 304, each video packet is encrypted independently as an encryption cell, as mentioned. The size of a video packet in MPEG-4 FGS varies from several hundred bits to several thousand bytes, depending on the transmission characteristics of the transmission network being used. The packet size is usually small if the operative network is a wireless network, and can be large for Internet applications. Packet size is determined at compression time, but can be changed at a later stage. Since the video packet separator vp_marker is used to indicate the boundary of an encryption cell, no modification of the video packet size is typically allowed after encryption.

In one implementation, the exemplary service level encrypter 304 includes an encryption engine 312 based on a low complexity encryption algorithm by Jakubowski and Venkatesan called "C&S encryption," which is used, with some modification, to encrypt each encryption cell. (Mariusz H. Jakubowski, Ramarathnam Venkatesan, "The Chain & Sum Primitive and Its Applications to MACs and Stream Ciphers", *EUROCRYPT '98*, pp. 281-293, 1998, incorporated herein by reference). C&S encryption denotes universal block chaining with sum, or, chain and sum primitive (C&S for short), which can be applied to the combination of encrypting and authenticating data. The primitive is a weak CBC-type encryption along with a summing step, and is used as a front end to stream ciphers to encrypt blocks of data in a video stream. Even though the exemplary encryption engine 312 encrypts large amounts of data, the encryption need be applied only once, like the FGS compression, since intermediate servers can perform their processing directly on the ciphertext in most cases. Since the C&S encryption is of low complexity, encryption and decryption are fast. The encryption applied by the exemplary encryption engine 312 typically causes no degradation to compression efficiency or effort resilience.

In other implementations, the encryption engine 312 can encrypt a frame or cell by replacing all or part of the C&S scheme with a generic stream cipher, such as RC4, etc. or a block cipher, such as DES, AES, RC5, etc, in various modes, such as ECB (Electronic Codebook), CBC (cipher block chaining), or OCB (Offset Codebook) modes.

In the exemplary C&S encryption algorithm, the original DES encryption of the pre-MAC (message authentication code) is replaced by RC5 encryption for speed. This encryption method does not increase the data size. Exemplary C&S encryption uses a reversible MAC to replace part of the data to be encrypted. The MAC value is used together with the encryption key to feed into a stream cipher like RC4 to encrypt the rest of the data. (The pre-MAC, as mentioned, is encrypted by RC5 to form the MAC.) Since the MAC is reversible, the encryption process can be reversed to get the original plaintext back if no bit errors occur. Since the stream cipher key depends on both the cell encryption key and also a hash value of the data to be encrypted, encryption security is guaranteed, that is, since the stream cipher key depends on both the global encryption key and the hash value of the data to be encrypted, contents with small differences will be encrypted into different ciphertexts even when the same global encryption key is repeatedly used.

In one implementation the exemplary C&S encryption is applied on the field of $Z(2^{31}-1)$ for increased speed. The security for each encryption cell is thus $2^{62}$. The encryption details for a cell can be described as follows. It should be noted that the decryption process is the reverse of the following encryption steps.

Let the encryption cell be denoted as $$X|x_p = x_0 x_1 \wedge x_n | x_p \qquad \text{Equation (1)}$$

where $x_p$ is a partial block and "|" means an appending operation. Let the key for the cell encryption be K. Two linear functions are defined as $$f(x) = ax + b \qquad \text{Equation (2)}$$

and $$g(x) = cx + d. \qquad \text{Equation (3)}$$

Next $$C = c_0 c_1 \wedge c_n \qquad \text{Equation (4)}$$

is calculated, where $$c_0 = f(ex_0) \qquad \text{Equation (5)}$$

and $$c_i = f(c_{i-1} + ex_i) \qquad \text{Equation (6)}$$

are used for even i>0, and $$c_i = g(c_{i-1} + e'x_i) \qquad \text{Equation (7)}$$

is used for odd i>0. Let $$y_k = c_k \qquad \text{Equation (8)}$$

for $$k \neq n-1, \qquad \text{Equation (9)}$$

and $$y_{n-1} = \Sigma_{k=0}^{n} c_k. \qquad \text{Equation (10)}$$

The pre-MAC is denoted by $$s = y_{n-1} y_n. \qquad \text{Equation (11)}$$

The pre-MAC can be considered as the "hash" value of x. Then $$s = y_{n-1} y_n \qquad \text{Equation (12)}$$

is replaced by its ciphertext E(s) encrypted using RC5 with the key K for the cell. E(s) is called the MAC value of x.

The ciphertext of the encryption cell is obtained as $$Z = G(K|s) XOR(y_0 y_1 \ldots y_{n-2} | x_p), \qquad \text{Equation (13)}$$

where G(s) is the random sequence generated by RC4 with the input key as the combination of the encryption key K and the pre-MAC value s.

Using this exemplary C&S encryption, it is possible for the video packet separator vp_marker to appear in a ciphertext, even though the probability of this occurring is very small. To avert this possibility of confusion, the following technique may be used: if a ciphertext emulates vp_marker, then the vp_marker at the beginning of the cell is repeated, followed by a fixed number of bits, for example twenty-four bits, to represent the size of the encryption cell before appending the ciphertext. In another implementation, instead of repeating the vp_marker, two special markers are used to replace the resynchronization marker and fgs_bp_start_code, this indicates that emulation of the vp_marker has occurred. The same technique can be used if the hamming distance between vp_marker and any vector in the ciphertext is smaller than a threshold. This can avoid vp_marker emulation caused by bit errors. Since the probability of such an occurrence happening is exceedingly low, the byte overhead for implementing this technique is negligible.

The aforementioned C&S encryption method is a fast technique. Since encryption is performed only once by the content owner unless for a real time compression and encryption application, the encryption overhead normally occurs on the decryption side. The decryption overhead for most hardware is negligible.

In some implementations, the block cipher RC5 in the C&S encryption can be replaced by other block ciphers such as AES. RC4 can also be replaced by other stream ciphers. In other implementations, the C&S encryption can be replaced by a stream cipher or a block cipher with CBC or other modes and with appropriate processing instructions for a possible partial block when encrypting an encryption cell.

In one exemplary DRM method, encryption is executed after the compression, so it does not affect compression efficiency. Data added to the compressed bitstream in the header is about twenty-four bits for each frame to represent the number of video packets in the frame, to indicate how data is divided into bitrate service levels, and to provide room for when ciphertext emulates vp_marker. For a video at normal bitrate, such added bytes are negligible.

Key Management

The service level encrypter 304 also includes a key generator 314. The multimedia content may be simultaneously divided into a number of sets of service levels, that is, sets of quality layers. Each service level (quality layer) and each set of service levels may participate in a key management scheme. For example, suppose the total number of bit planes of exemplary FGS multimedia content has been divided into t adjacent groups by the exemplary service level generator 302 to form t PSNR (or other type of) service levels. A frame's enhancement data has also been divided into m different groups by the exemplary service level generator 302 to form m bitrate (or other type of) service levels, wherein each bitrate service level is aligned with the boundary of video packets. The FGS enhancement layer has then been divided into (m)×(t) (i.e., m times t) totally different segments. If the separation point for a bitrate service coincides with that of a PSNR service level, the corresponding segment is considered as empty with a length of zero. In one exemplary implementation, each segment is assigned an independently and randomly generated segment key denoted as Key($m_i$,$t_j$), where m equals an integer and t equals an integer.

Figure 4:
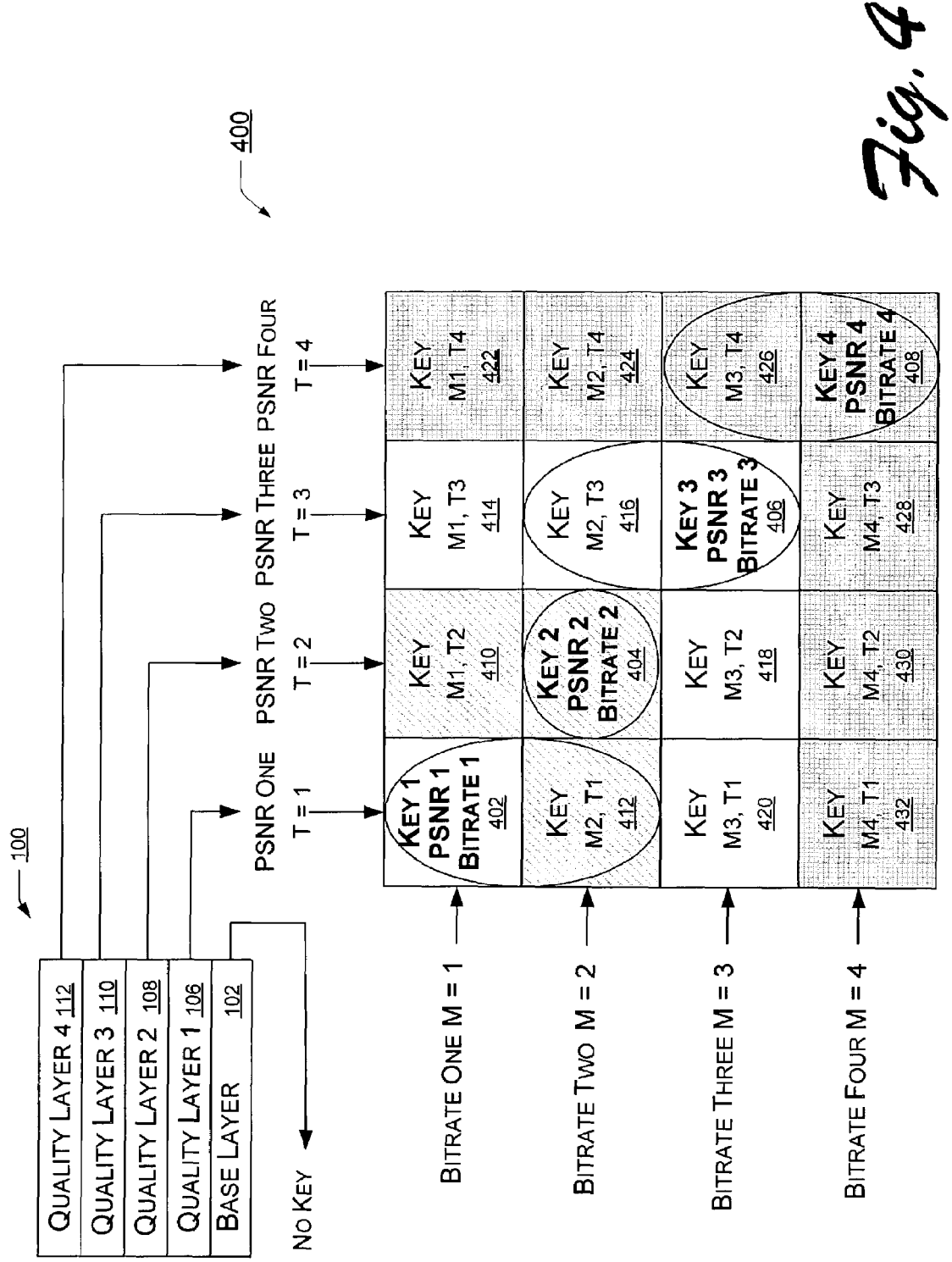
FIG. 4 is a graphic representation of exemplary segment keys for exemplary quality layers, according to one aspect of the subject matter.

FIG. 4 shows a matrix of exemplary corresponding segment keys 400 for the quality layers 106, 108, 110, 112 of the exemplary SMLFE stream 100. Corresponding segments (each represented by a key) are shown for the case of four bit planes (m=4) and four bitrate groups (t=4). The base quality layer 102 requires no keys for access in implementations in which the base quality layer 102 is unencrypted.

Each encryption cell in a segment is encrypted independently with the same segment key. When a user obtains a license for a certain service level, then all the keys for the obtained level and the lower service levels of the same service type will be contained, if needed, in the license delivered to the user. For example, if the obtained service level is the PSNR service level t=2, the license will contains all the keys, i.e., key(m, t), where t<=2. This key distribution is similar for the case of bitrate service levels. A user with licensed access to a certain level of service within a certain service type (PSNR or bitrate) can only access that service level and lower service levels of the same type. The user cannot access higher levels with the same type of service or any service levels of the other type of service.

Since PSNR service levels have some correlation with the bitrate service levels, the keys likely to be used for actual encryption are usually the keys along (i.e., on or close to) a diagonal of the matrix in FIG. 2, namely keys 402, 404, 406, and 408. But multiple keys may also be useful for a given service level, as shown by circled keys in FIG. 4. In one implementation, a license for PSNR service level one for access to quality layer one 106 uses keys 402 and 412. A license for PSNR service level two for access to quality layer two 108 uses key 404. A license for PSNR service level three for access to quality layer three 110 uses keys 406 and 416. A license for PSNR service level four for access to quality layer four 112 uses keys 408 and 426.

In implementations in which the super distribution model is used, the unused keys (those keys for service levels lower than the highest service level licensed to a user) have no impact on content encryption. Extra keys unused by the user affect only the amount of data in a license. To reduce the size in bytes of a license for some applications, such as those in mobile devices, the unused keys to be sent with (or in) a license may be discarded before sending the license.

To reduce the number of keys that would need to be transferred to a user, an exemplary (1, 2)-threshold scheme can be used. (A. Shamir, "How to Share a Secret," *Communications of ACM*, vol. 24, no. 11, 1979, pp. 612-613, incorporated herein by reference). In an exemplary implementation of the threshold scheme, knowledge of either $key_b(m_i)$ or $key_p(t_j)$ will be able to decrypt the segment($m_i$, $t_j$). Two independent random keys are generated as the keys for the highest service level of the PSNR type and highest service level of the bitrate type, respectively. Keys for other service levels are generated in the following way: the key for the current service level is generated by applying a cryptographically secure hashing function to the key of the next higher service level of the same type. When a user buys access to a certain service level, say PSNR level three, a single key corresponding to that level, $key_p(3)$, is sent to the user. The keys for lower PSNR levels, $key_p(k)$ can be found by hashing $key_p(k+1)$, where k=1, 2. These keys are then used in the (1, 2)-threshold scheme to decrypt encryption cells for each segment the user is able to access.

Even though the enhancement layer data 104 is divided into segments, additional marks (to mark the end of each segment) do not have to be added. In MPEG-4 FGS each bit plane starts with a bit plane marker that can also be used to indicate PSNR service level boundaries. A custom header can be added to each frame to indicate the number of video packets in the enhancement layer of the frame at the time of encryption, and to indicate the bitrate grouping scheme (this allows different grouping schemes in case different frames have different video packet characteristics). In one implementation, twenty-four bits are adequate for this purpose. The number of bits can be adjusted for each specific application. A description of the scheme used to group exemplary divisions of the content into quality layer sets of bit planes and bit rates (i.e., in video packets for bitrate service levels) can be placed into the license or at the beginning of a multimedia stream as a header. In this way, the exemplary DRM subject matter provides negligible compression overhead: that is, only twenty-four bits added to a compressed stream in one implementation, sixteen bits are added in another implementation.

In streaming applications using some types of quality layer sets, a streaming server may derive, for example, the bitrate service level separation points to avoid streaming extra data that the user does not have permission to access. An assistant file of side information containing all breakpoints for bitrate service levels can also be used for this purpose. The assistant file is not sent to users so it does not consume any communication bandwidth from the user's standpoint. This can also be achieved by inserting the side information containing all breakpoints for quality layers (as well as segments, if needed) directly into a multimedia format. This allows a streaming server to select what to send without sending this side information itself to a user.

Control of Simultaneous Quality Layer Sets

Returning to FIG. 3, the exemplary DRE 204 may also include the bimodal service controller 306. Since the enhancement layer 104 of the MPEG-4 FGS bitstream 322 is divided by the service level generator 302 into groups of adjacent bit planes for user access to PSNR service levels and also into bitrate groups for user access to bitrate service levels, the bimodal service controller 306, in one implementation, administers access to these two types of service. The PSNR service controller 316 in the bimodal service controller 306 may sense from the ciphertext or from a user request that a PSNR service level should be used and assist the service level access grantor 306 with supplying content via a PSNR service level and designating the keys to include in a PSNR license. Likewise, the bitrate service controller 318 in the bimodal service controller 306 may sense from the ciphertext or from a user request that a bitrate service level should be used and assist the service level access grantor 306 with supplying content via a bitrate service level and designating the keys to include in a bitrate license.

The exemplary DRE 204 may also include the service level access grantor 308 to receive requests for the various PSNR and bitrate service levels, and to grant permission to use the service levels and/or to download a PSNR or bitrate quality layer. Granting permissions usually entails revealing the decryption secret for the service level and type of service requested. Decryption secrets are typically decryption keys, but may also contain encryption keys if re-encryption is needed for license transferring or other operations executed at the user side. Thus, the service level access grantor 308 may also include the key distributor 320, which determines the key(s) that should be included in a license to use a service level.

The service level access grantor 308 may be deployed with the rest of the exemplary DRE 204 in a content delivery server 202 or other computing device. Alternatively, the service level access grantor 308 may be deployed remotely (340), for example, in a separate license and charge server 208.

Exemplary Methods

Figure 5:
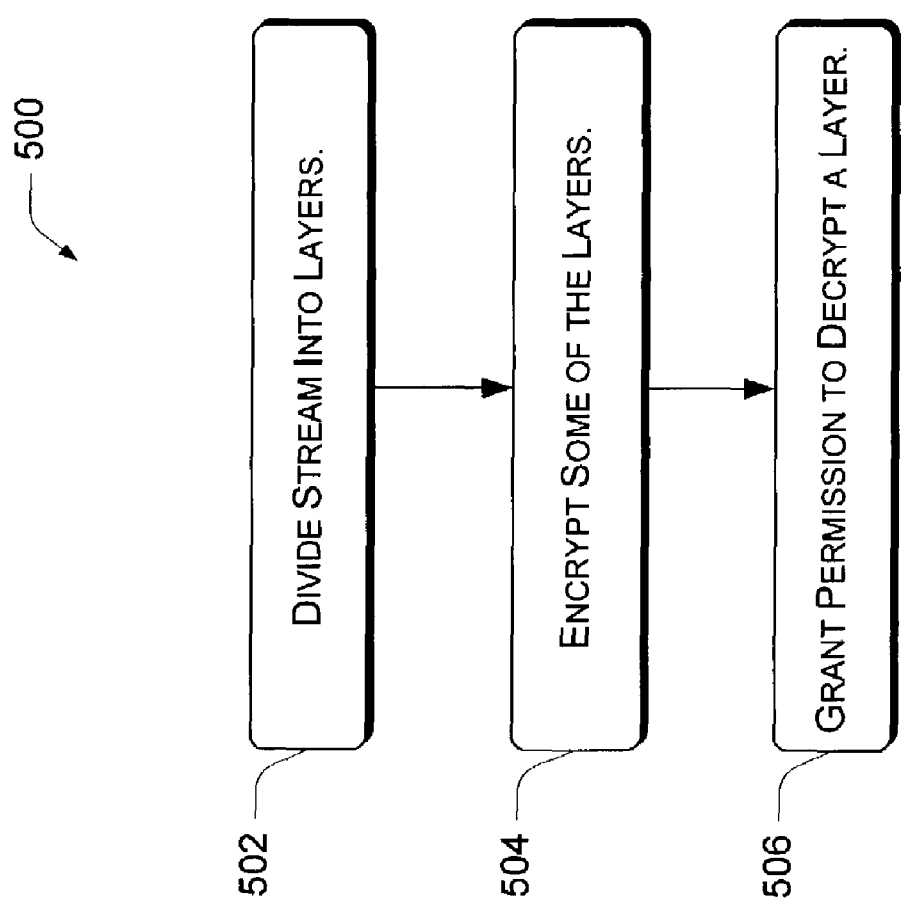
FIG. 5 is a flow diagram of an exemplary digital rights management method.

FIG. 5 shows an exemplary DRM method 500. This exemplary DRM method 500 can be performed by a device, such as the exemplary DRE 204 shown in FIGS. 2 and 3. In the flow diagram, the operations are summarized in individual blocks. The operations may be performed in hardware and/or as machine-readable instructions (software or firmware) that can be executed by a processor.

At block 502, a multimedia stream is divided into layers. The layers may be quality layers, that is, the multimedia stream is divided in such a manner that the human eye, ear, or a device can perceive differences between one layer and another. In a MPEG-4 FGS bitstream, the base layer 102 may be one of the quality layers and the enhancement layer 104 may be divided up into quality layers. This may be accomplished by grouping adjacent bit planes of the enhancement layer 104 into PSNR levels. Another type of quality is stream bitrate. A lower bitrate may be desirable in some circumstances when visual quality is not needed but quick downloading is desired. Hence, the multimedia stream can also be divided into layers by bitrate. When the enhancement layer contains enhancement data for other scalabilities such as frame size scalability, frame rate scalability, color depth scalability, etc., quality layers can also be determined based on frame size, frame rate, color depth, or any combinations of these and the PSNR and bitrate types.

At block 504, at least some of the layers from the division at block 502 are encrypted. If the layers are encrypted using separate keys for each layer, then access may be controlled through permissions for each layer.

At block 506, access is granted to a layer by revealing how to decrypt the layer. Permission to decrypt the layer may be granted by giving a license, and the license may contain one or more keys for the decryption.

Figure 6:
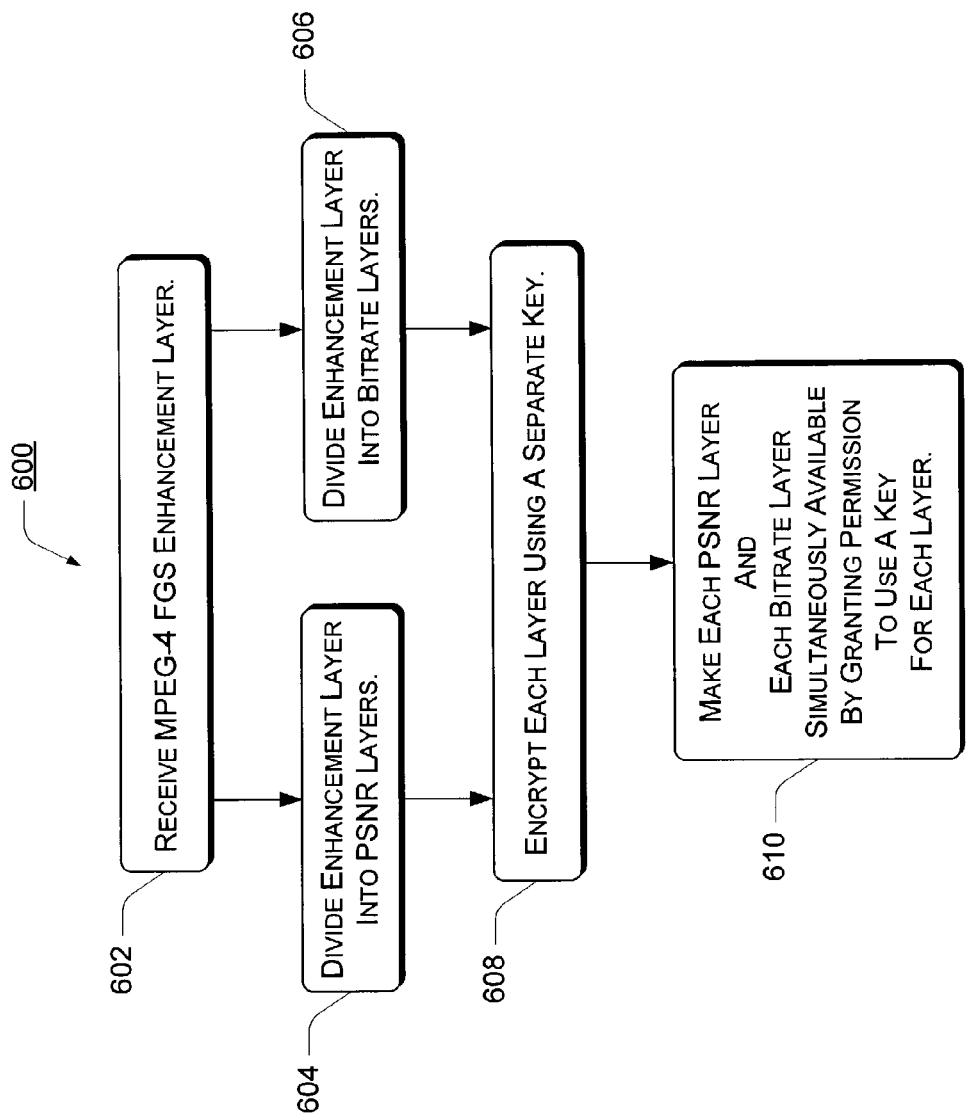
FIG. 6 is a flow diagram of another exemplary digital rights management method.

FIG. 6 shows another exemplary DRM method. This exemplary DRM method 600 can be performed by a device, such as the exemplary DRE 204 shown in FIGS. 2 and 3. In the flow diagram, the operations are summarized in individual blocks. The operations may be performed in hardware and/or as machine-readable instructions (software or firmware) that can be executed by a processor.

At block 602, a base layer and an enhancement layer of a MPEG-4 FGS bitstream are received.

At blocks 604 and 606, the received enhancement layer is simultaneously divided two different ways. At block 604 the received enhancement layer is divided into PSNR quality layers by grouping adjacent bit planes. The groupings may be selected according to need and/or taste. At block 606, the received enhancement layer is also simultaneously divided into bitrate quality layers by selecting bitrate groups according to need and/or taste.

At block 608, the PSNR quality layers and the bitrate quality layers of the enhancement layer are encrypted using a separate key for each layer.

At block 610, keys for PSNR quality layers and bitrate quality layers are simultaneously made available by permission while the base layer is made available without permission. Access by permission to either a PSNR quality layer or a bitrate quality layer can be granted to a user depending on the type of request for permission received.

Error Resilience and Performance

A real network is not perfect. Bit errors and packet losses occur during multimedia transmission over a network, so error resilience is desirable. Implementations of the exemplary DRE 204 assume that a transport packet contains complete video packets so that when packet loss occurs, a whole video packet is completely lost and also that the header of a transport packet contains information regarding the indexes of the video packets it contains. Thus, when a video packet is received, the header makes it easy to place the packet in the correct order or position regardless of whether previous video packets are lost during transmission. These assumptions are valid for almost all multimedia networks in real applications.

Using the above assumptions and the manner in which segment encryption keys are assigned by the exemplary segment encryption engine 312, if a received video packet can be decompressed, it can also be decrypted. Thus, the exemplary encryption adds no additional negative impact to packet loss, and the exemplary encryption is not detrimentally affected by packet losses. In other words, the exemplary DRM method is robust to packet loss.

In MPEG-4, if bit errors occur in a received bit stream, the video packet that contains the bit errors are normally discarded. With the exemplary DRM method, a bit error in an encryption cell may expand to other bits inside the cell, but never expands to other cells, because each cell is encrypted independently. Only the corrupted cell will be discarded. Since an encryption cell is the same as a video packet, as described above, the exemplary encryption method adds no additional negative impact to bit errors. Thus, the exemplary DRM method is robust to bit errors as well as packet losses.

It is not always necessary to make encryption cells the same size as the video packets in the exemplary DRM method. It is possible to divide a video packet into several encryption cells by using a scheme that depends only on the size of the video packet. This can reduce the granularity of the service levels without sacrificing their error resilience.

Experimental Results

The enhancement layer 104 was divided into four PNSR service levels and four bitrate service levels, with the same number of bit planes in each PSNR level, and nearly equally bytes (aligned with video packets) for each bitrate level. All experiments were carried out on a DELL® personal computer with 512 megabytes of RAM and an INTEL® PENTIUM® III processor running at 667 megahertz.

Figure 7:
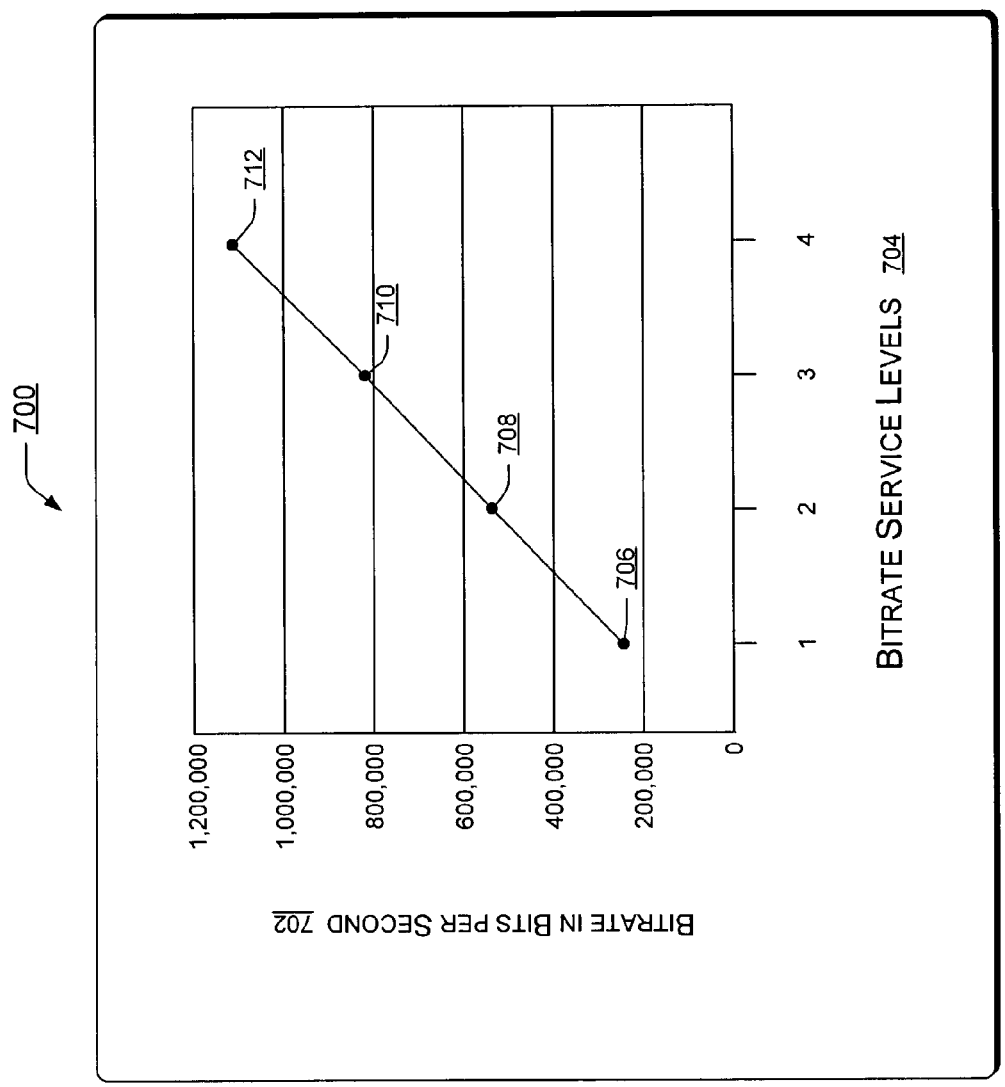
FIG. 7 is a diagrammatic illustration of an exemplary comparison of bitrate service levels.

FIG. 7 shows a comparison 700 of exemplary achieved bitrate service levels. The bitrate 702 is plotted against the bitrate service levels 704. An exemplary first bitrate service level 706 has an average bitrate of 250,000 bits per second), an exemplary second bitrate service level 708 has an average bitrate of 510,000 bits per second, a third exemplary bitrate service level 710 has an average bitrate of 800,000 bits per second, and a fourth exemplary bitrate service level 712 has an average bitrate of 1,100,000 bits per second. The separation between bitrate levels presents as a linear relationship in FIG. 7.

Figure 8:
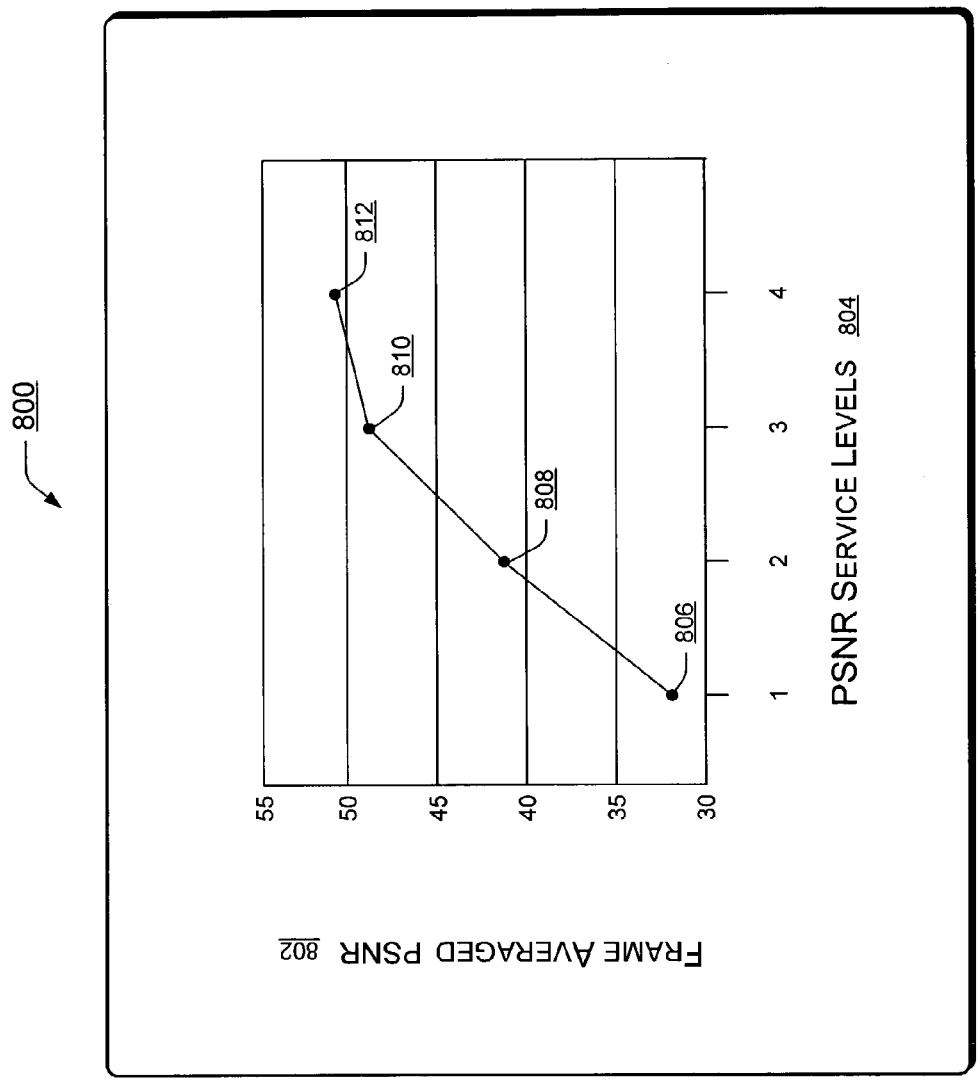
FIG. 8 is a diagrammatic illustration of an exemplary comparison of peak signal-to-noise ratio service levels.

FIG. 8 shows a comparison 800 of exemplary achieved PSNR service levels. The "frame average" peak signal-to-noise-ratio ("averaged PSNR" 802) for each exemplary PSNR service level is plotted against the PSNR service level numbers 804. The PSNR is approximately constant across frames for the brightness and color components Y, U, and V, shown as an averaged single line in FIG. 8. The separation of the first three PSNR service levels 806, 808, 810 from each other agrees with one implementation of quality layer design by the exemplary service level generator 302. The fourth PSNR level 812 does not maintain the same separation from PSNR service level three 810 as service levels one, two, and three maintain from each other, because PSNR service level four 812 does not contain complete bit plane data due to the bits assigned to each frame by FGS compression.

Figure 9:
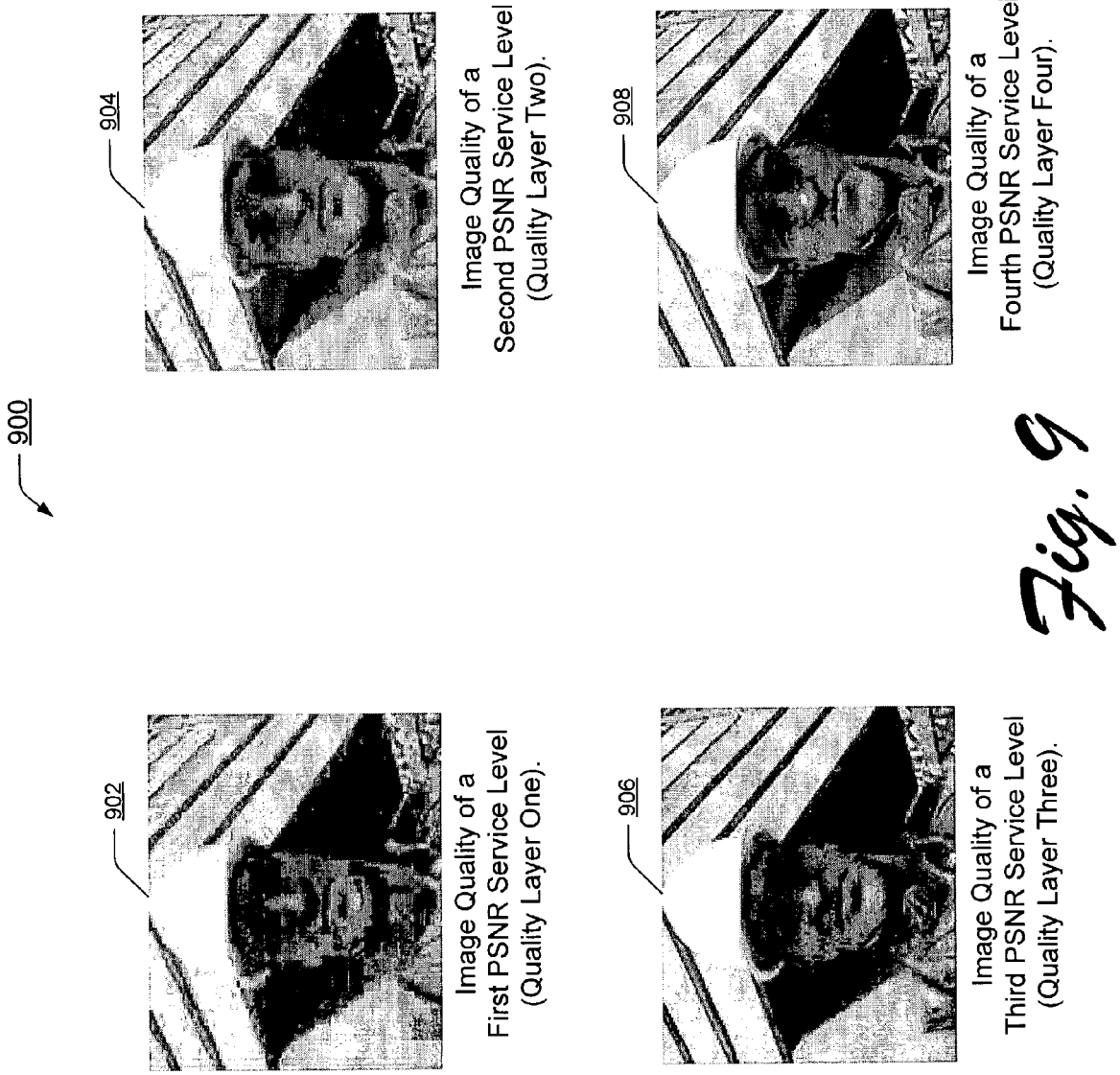
FIG. 9 is a set of exemplary video images yielded by the peak signal-t-noise ratio service levels shown in FIG. 8.

FIG. 9 shows exemplary visual effects 900 yielded by the PSNR service levels shown in FIG. 8. The image quality improves with higher PSNR service levels as more quality layers are available to construct the image. Image one of "the foreman" 902 has low resolution and blockiness characteristic of a low PSNR value of approximately 32 for PSNR service level one 606. Image two of "the foreman" 904 has improved resolution and definition, but some blockiness is still evident due to the average PSNR value of approximately 42 for PSNR service level two 608. Image three of "the foreman" 906 shows better quality due to a PSNR value of approximately 48 for PSNR service level three 610, but still shows some low resolution artifacts and irregularities upon close inspection. Image four of "the foreman" 908 has the best resolution of the four images including the best sharpness and absence of ringing, due to the highest PSNR value of approximately 51 for PSNR service level four 612. A user can subscribe to the service level that best suits the user's need for quality or minimal downloading time.

CONCLUSION

The foregoing describes an exemplary DRE 204 and related DRM methods for secure layered access control of multimedia streams, such as MPEG-4 FGS bitstreams and other scalable media. Both PSNR-based layered control and bitrate-based layered control are realized within the same framework and neither type of control jeopardizes the other type of control. It should be noted that the subject matter described above can be implemented in hardware, in software, or in both hardware and software. In certain implementations, the exemplary DRE 204 and related DRM methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A method, comprising:
   dividing an enhancement layer of a multimedia content into multiple sets of separate quality layers, wherein one of the multiple sets of separate quality layers comprises peak signal-to-noise ratios (PSNR) quality levels which are determined by selecting groups of adjacent bit planes of the enhancement layer, and wherein one of the multiple sets of separate quality layers comprises bitrate quality levels;
   encrypting at least some of the quality layers using a separate secret for each quality layer encrypted; and
   granting permission to access an encrypted quality layer by revealing the secret of the encrypted quality layer.

2. The method as recited in claim 1, wherein one of the multiple sets of separate quality layers comprises frame sizes.

3. The method as recited in claim 1, wherein one of the multiple sets of separate quality layers comprises frame rates.

4. The method as recited in claim 1, wherein one of the multiple sets of separate quality layers comprises color depths.

5. The method as recited in claim 1, wherein one of the multiple sets of separate quality layers comprises quantity of audio channels.

6. The method as recited in claim 1, wherein one of the multiple sets of separate quality layers comprises sampling rates.

7. The method as recited in claim 1, wherein one of the multiple sets of separate quality layers comprises frequency bands.

8. The method as recited in claim 1, wherein one of the multiple sets of separate quality layers comprises audio sample resolutions.

9. The method as recited in claim 1, wherein the permission is a license specific to the encrypted quality layer.

10. The method as recited in claim 1, wherein the multimedia content is a MPEG-4 FGS bitstream.

11. The method as recited in claim 1, wherein the multimedia content uses a SMART or SMART++scalable media adaptation and robust transport coding technology.

12. The method as recited in claim 1, further comprising leaving one or more of the quality layers unencrypted for access without the permission.

13. The method as recited in claim 10, wherein a base layer of the MPEG-4 FGS bitstream is left unencrypted and an enhancement layer of the MPEG-4 FGS bitstream is divided into the quality layers.

14. The method as recited in claim 13, wherein the quality layers are groups of adjacent bit planes and bitrate groups.

15. The method as recited in claim 14, wherein each group of adjacent bit planes is a peak signal-to-noise ratio (PSNR) service level and each bitrate group is a bitrate service level.

16. The method as recited in claim 15, further comprising simultaneously granting permissions to access PSNR service levels and bitrate service levels.

17. The method as recited in claim 1, further comprising rate shaping the encrypted quality layers without decryption.

18. The method as recited in claim 1, further comprising providing a user with all the multimedia content and providing a key to access one of the quality layers without downloading multimedia content.

19. An apparatus, comprising:
a means for dividing a multimedia content into multiple sets of separate quality layers, wherein one of the multiple sets of separate quality levels comprises peak signal-to-noise ratios (PSNR) quality levels which are determined by selecting groups of adjacent bit planes of an enhancement layer, and wherein one of the multiple sets of separate quality layers comprises bitrate quality levels;
a means for encrypting at least some of the quality layers using a separate key for each quality layer encrypted; and
a means for granting access to a key to decrypt a quality layer.

20. The apparatus as recited in claim 19, wherein the multimedia content is a MPEG-4 FGS bitstream.

21. The apparatus as recited in claim 19, wherein the multimedia content is an audio-visual representation using SMART or SMART++scalable media adaptation and robust transport coding technology.

22. The apparatus as recited in claim 19, wherein each quality layer can be accessed simultaneously as both a peak signal-to-noise ratio (PSNR) service level and a bitrate service level.

23. The apparatus as recited in claim 19, wherein the means for encrypting is an encryption engine using universal block chaining with sum primitive.

24. The apparatus as recited in claim 19, wherein the means for encrypting in an encryption engine using weak CBC encryption and a summing step.

25. The apparatus as recited in claim 19, wherein the means for encrypting uses a stream cipher.

26. The apparatus as recited in claim 25, wherein the stream cipher is RC4.

27. The apparatus as recited in claim 19, wherein the means for encrypting uses a block cipher.

28. The apparatus as recited in claim 27, wherein the block cipher is one of DES, AES, and RC5.

29. The apparatus as recited in claim 28, wherein the block cipher uses an electronic codebook mode (ECB), a block chaining mode (CBC), or an offset codebook (OGB) mode.

30. The apparatus as recited in 19, wherein the means for encrypting uses C&S encryption.

31. The apparatus as recited in claim 30, wherein the C&S encryption includes replacing RC4 encryption with a generic stream cipher.

32. The apparatus as recited in claim 30, wherein the C&S encryption includes replacing DES encryption of the pre-message authentication code with RC5 encryption.

33. The apparatus as recited in claim 30, wherein the C&S encryption includes replacing DES encryption of the pre-message authentication code with AES encryption.

34. The apparatus as recited in claim 30, wherein the C&S encryption uses a reversible message authentication code to replace part of data in the content to be encrypted.

35. The apparatus as recited in claim 34, wherein the message authentication code and an encryption key are used with a stream cipher to encrypt the data.

36. The apparatus as recited in claim 35, wherein a stream cipher key depends on both the encryption key and a hash value of the data to be encrypted.

37. The apparatus as recited in claim 19, wherein the means for granting access is a service level access grantor to receive a request for a key and to reveal the key.

38. The apparatus as recited in claim 37, wherein the service level access grantor is deployed in a license server.

39. The apparatus as recited in claim 38, wherein the apparatus is deployed in a multimedia content sewer except the service level access grantor.

40. The apparatus as recited in claim 19, further comprising a bimodal service controller, wherein the bimodal service controller simultaneously administers a peak signal-to-noise ratio service and a bitrate service.

41. The apparatus as recited in claim 19, further comprising a service controller to simultaneously administer a combination of quality layer sets, wherein each quality layer set is selected from a group of quality layer sets consisting of a peak signal-to-noise ratios (PSNR) quality layer set, a bitrate quality layer set, a frame size quality layer set, a frame rate quality layer set, a color depth quality layer set, a quantity of audio channel quality layer set, a sampling rate quality layer set, a frequency band quality layer set, and an audio sample resolution quality layer set.

42. One or more computer readable media containing instructions that are executable by a computer to perform actions comprising:
dividing a multimedia content into multiple sets of separate quality layers, wherein one of the multiple sets of separate quality layers comprises peak signal-to-noise ratios (PSNR) quality levels which are determined by grouping adjacent bit planes of the multimedia content, and wherein one of the multiple sets of separate quality layers comprises bitrate quality levels;
encrypting at least some of the quality layers using a separate key for each quality layer to be encrypted; and
granting a license to use a key to decrypt one of the quality layers.

43. The one or more computer readable media as recited in claim 42, wherein the dividing is accomplished based on one of frame size, frame rate, color depth, quantity of audio channels, sampling rate, frequency band, and audio sample resolution.

44. The one or more computer readable media as recited in claim 43, further comprising instructions that are executable by a computer to perform the action of simultaneously granting licenses to access PSNR service levels and bitrate service levels.

45. The one or more computer readable media as recited in claim 44, further comprising instructions that are executable by a computer to perform the action of simultaneously granting licenses to access service levels based on frame size, frame rate, color depth, quantity of audio channels, sampling rate, frequency band, and audio sample resolution.

46. The one or more computer readable media as recited in claim 45, further comprising instructions that are executable by a computer to perform the action of simultaneously administering PSNR quality layer content for the PSNR service levels and bitrate quality layer content for the bitrate service levels.

47. The one or more computer readable media as recited in claim 46, further comprising instructions that are executable by a computer to perform the action of simultaneously administering quality layer content for the service levels corresponding to frame size, frame rate, color depth, quantity of audio channels, sampling rate, frequency band, and audio sample resolution.

48. The one or more computer readable media as recited in claim 42, further comprising instructions that are executable by a computer to perform the action of leaving one of the quality layers unencrypted for access without a key.

49. The one or more computer readable media as recited in claim 42, further comprising instructions that are executable by a computer to perform the action of downloading the difference between a lower quality layer and a higher quality layer when a user already has a key to decrypt the, lower quality layer and receives a key to decrypt the higher quality layer.

50. The one or more computer readable media as recited in claim 42, wherein the encrypting allows rate shaping of a quality layer without decrypting the quality layer.

51. A method of key management, comprising:
dividing a scalable multimedia content into two or more quality layer sets including a first quality layer set comprising peak signal-to-noise ratios PSNR quality levels which are determined by selecting groups of adjacent bit planes of an enhancement layer and a second quality layer comprising bitrate quality levels, wherein each quality layer set includes quality layers ranging from a lower quality to a higher quality, and wherein a first quantity of quality layers in the first quality layer set multiplied by a second quantity of quality layer in the second quality layer set defines a number of content segments;
encrypting at least some of the quality layers; and
assigning a separate key to each of the segments.

52. The method as recited in claim 51, wherein a first key from a lower quality layer in a quality layer set can be derived from a second key of the next higher quality layer in the quality layer set.

53. The method as recited in claim 52, wherein the first key is derived from the second key by hashing at least part of the second key.

54. The method as recited in claim 51, further comprising simultaneously using a first set of keys for the first quality layer set and a second set of keys for the second quality layer set.

55. The method as recited in claim 54, wherein a content segment defined by multiple quality layer sets may be decrypted by using a key from only one of the multiple quality layer sets.

56. The method as recited in claim 51, wherein a first independent random key is generated for the highest quality layer in the first quality layer set and a second independent random key is generated for the highest quality layer in the second quality layer set.

57. The method as recited in claim 56, wherein keys for quality layers lower than the highest quality layers in the first quality layer set and the second quality layer set are generated by securely hashing a key of the next higher quality layer in the respective first and second quality layer sets.

58. The method as recited in claim 51, further comprising:
generating a set of keys for each quality layer set, wherein one key is generated for each quality layer in each quality layer set; and
applying to each of the segments a threshold encryption scheme using keys from the sets of keys, wherein at most one key from each set of keys is used.

59. The method as recited in claim 58, wherein the threshold scheme is a (1, n)-threshold encryption scheme, where n is a number of sets of keys.

60. The method as recited in claim 51, further comprising:
generating a first set of keys for the quality layers in the first quality layer set;
generating a second set of keys for the quality layers in the second quality layer set; and
applying to each of the segments a threshold encryption scheme using a first key from the first set of keys and a second key from the second set of keys.

61. The method as recited in claim 60, wherein the threshold scheme is a (1, 2)-threshold encryption scheme.

62. The method as recited in claim 61, further comprising using one of the keys from the first and second sets of keys to decrypt a segment.

63. The method as recited in claim 51, wherein each of the two or more quality layer sets is selected from a group of quality layer sets consisting of a frame size quality layer set, a frame rate quality layer set, a color depth quality layer set, a quantity of audio channel quality layer set, a sampling rate quality layer set, a frequency band quality layer set, and an audio sample resolution quality layer set.

* * * * *